(12) United States Patent
Jiang et al.

(10) Patent No.: US 8,909,013 B1
(45) Date of Patent: Dec. 9, 2014

(54) TRACEABLE CABLE ASSEMBLY

(71) Applicant: Amphenol Fiber Optic Technology (Shenzhen), Shenzhen, Guangdong Province (CN)

(72) Inventors: Bolin Jiang, Shenzhen (CN); Songsheng Li, Shenzhen (CN); Min Chen, Shenzhen (CN); Linghua Zhu, Shenzhen (CN)

(73) Assignee: Amphenol Fiber Optic Technology (Shenzhen), Shenzhen, Guangdong Province (CN)

( * ) Notice: Subject to any disclaimer, the term of this patent is extended or adjusted under 35 U.S.C. 154(b) by 0 days.

(21) Appl. No.: 14/102,598

(22) Filed: Dec. 11, 2013

(30) Foreign Application Priority Data

Jun. 14, 2013 (TW) .............................. 102211181 U (51) Int. Cl.
*G02B 6/44* (2006.01)

(52) U.S. Cl.
CPC .................................... *G02B 6/4401* (2013.01)
USPC ........... 385/101; 385/100; 385/102; 385/106; 385/115; 385/116

(58) Field of Classification Search
CPC .. G02B 6/4416; G02B 6/3817; G02B 6/4494; G02B 6/4433; H01B 11/22
USPC .................. 385/100, 101, 102, 106, 115, 116
See application file for complete search history.

(56) References Cited

U.S. PATENT DOCUMENTS

| 7,612,288 B1* | 11/2009 | Gundogan et al. ............ 174/112 |
| 2014/0090603 A1* | 4/2014 | Hawk .............................. 119/72 |

* cited by examiner

*Primary Examiner* — Jennifer Doan
(74) *Attorney, Agent, or Firm* — Nixon & Vanderhye P.C.

(57) ABSTRACT

A traceable cable assembly comprises: a fiber optic cable including a cable jacket that encloses an optical fiber, and two conductive elements that are embedded spacedly in the cable jacket and that extend along the optical fiber; and multiple lighting units spacedly secured to the fiber optic cable. Each lighting unit includes a connecting seat provided with a light emitting element, and mounted to the fiber optic cable so that the light emitting element is connected electrically between the conductive elements through the connecting seat. A portable power device is detachably coupled to the connecting seat of one lighting unit for supplying a supply voltage to the light emitting element of each lighting unit through the conductive elements.

15 Claims, 10 Drawing Sheets

TRACEABLE CABLE ASSEMBLY

CROSS-REFERENCE TO RELATED APPLICATION

This application claims priority to Taiwanese Application No. 102211181, filed on Jun. 14, 2013, the contents of which are hereby incorporated by reference.

BACKGROUND OF THE INVENTION

1. Field of the Invention

The invention relates to a fiber optic cable, and more particularly to a traceable cable assembly.

2. Description of the Related Art

An optical fiber is a flexible, transparent fiber made of glass (silica) or plastic and having a diameter of about 0.1 mm. It can function as a waveguide to transmit light between opposite ends of the optical fiber. Optical fibers are widely used in fiber-optic communications, which permit transmission over longer distances and at higher bandwidths than other forms of communication because signals travel along them with less loss and without electromagnetic interference.

For a fiber optical cable bundle including a group of fiber optic cables, if one fiber optic cable is determined to be broken (malfunctioning) by an optical fiber tester coupled to one end of said one fiber optic cable, it is troublesome to distinguish the other end of the broken fiber optic cable for a further repair process, thereby resulting in time-consuming identification of the broken fiber optic cable.

SUMMARY OF THE INVENTION

Therefore, an object of the present invention is to provide a traceable cable assembly that can overcome the aforesaid drawback of the prior art.

According to one aspect of the present invention, a traceable cable assembly comprises a fiber optic cable, a plurality of lighting units and a portable power device.

The fiber optic cable includes at least one optical fiber, a cable jacket enclosing the at least one optical fiber, and two conductive elements embedded spacedly in the cable jacket and extending along the at least one optical fiber.

The lighting units are spacedly secured to the fiber optic cable. Each of the lighting units includes a connecting seat mounted to the fiber optic cable and connected electrically to the conductive elements of the fiber optic cable, and a light emitting element mounted to the connecting seat in a manner that the light emitting element is connected electrically between the conductive elements of the fiber optic cable.

The power device is detachably coupled to the connecting seat of one of the lighting units for supplying a supply voltage to the light emitting element of said one of the lighting units and to the light emitting element(s) of the other one(s) of the lighting units through the conductive elements of the fiber optic cable, such that the light emitting element of each of the lighting units emits light in response to the supply voltage from the power device.

According to another aspect of the present invention, there is provided an apparatus for tracking a fiber optic cable. The fiber optic cable includes at least one optical fiber, a cable jacket enclosing the at least one optical fiber, and two conductive wires embedded spacedly in the cable jacket and extending along the at least one optical fiber. The apparatus of this invention comprises a plurality of lighting units and a portable power device.

The lighting units are adapted to be spacedly secured to the fiber optic cable. Each of the lighting units includes a connecting seat adapted to be mounted to the fiber optic cable and adapted to be connected electrically to the conductive wires of the fiber optic cable, and a light emitting element mounted to the connecting seat in a manner that the light emitting element is connected electrically between the conductive wires of the fiber optic cable.

The power device is detachably coupled to the connecting seat of one of the lighting units for supplying a supply voltage to the light emitting element of said one of the lighting units and to the light emitting element(s) of the other one(s) of the lighting units through the conductive wires of the fiber optic cable, such that the light emitting element of each of the lighting units emits light in response to the supply voltage from the power device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
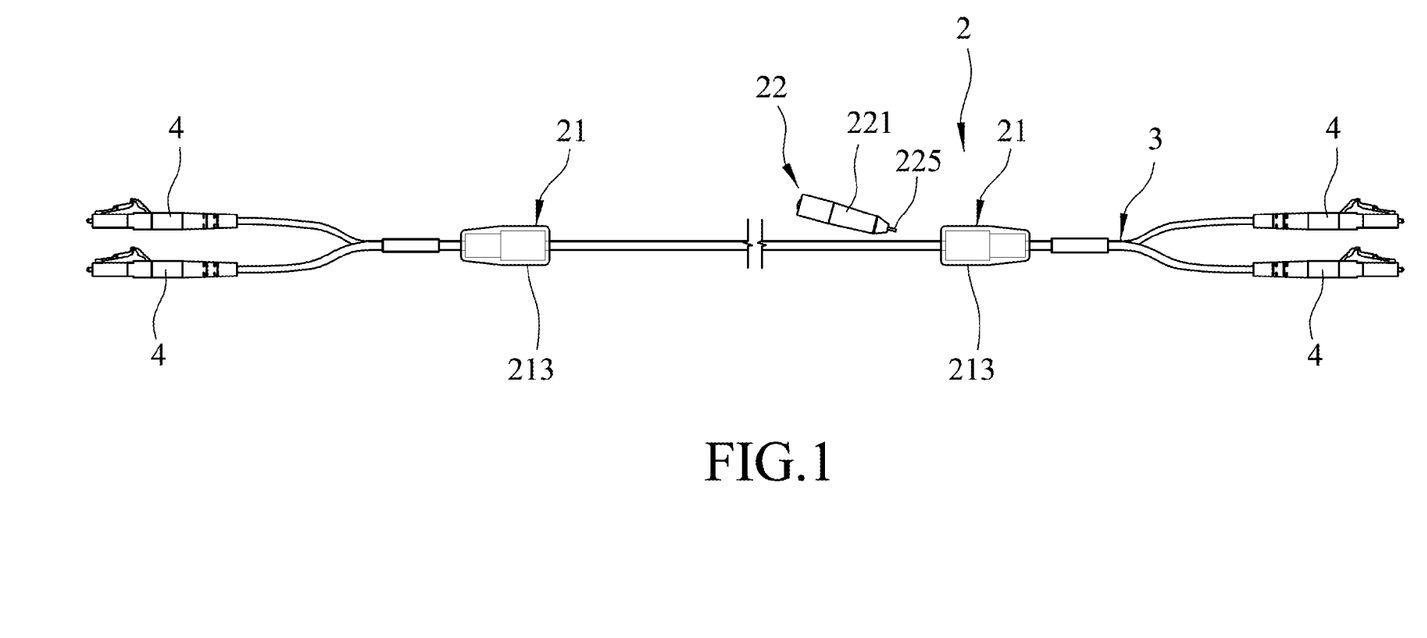
FIG. 1 is a fragmentary schematic view showing the first preferred embodiment of a traceable cable assembly according to the present invention.
Figure 8:
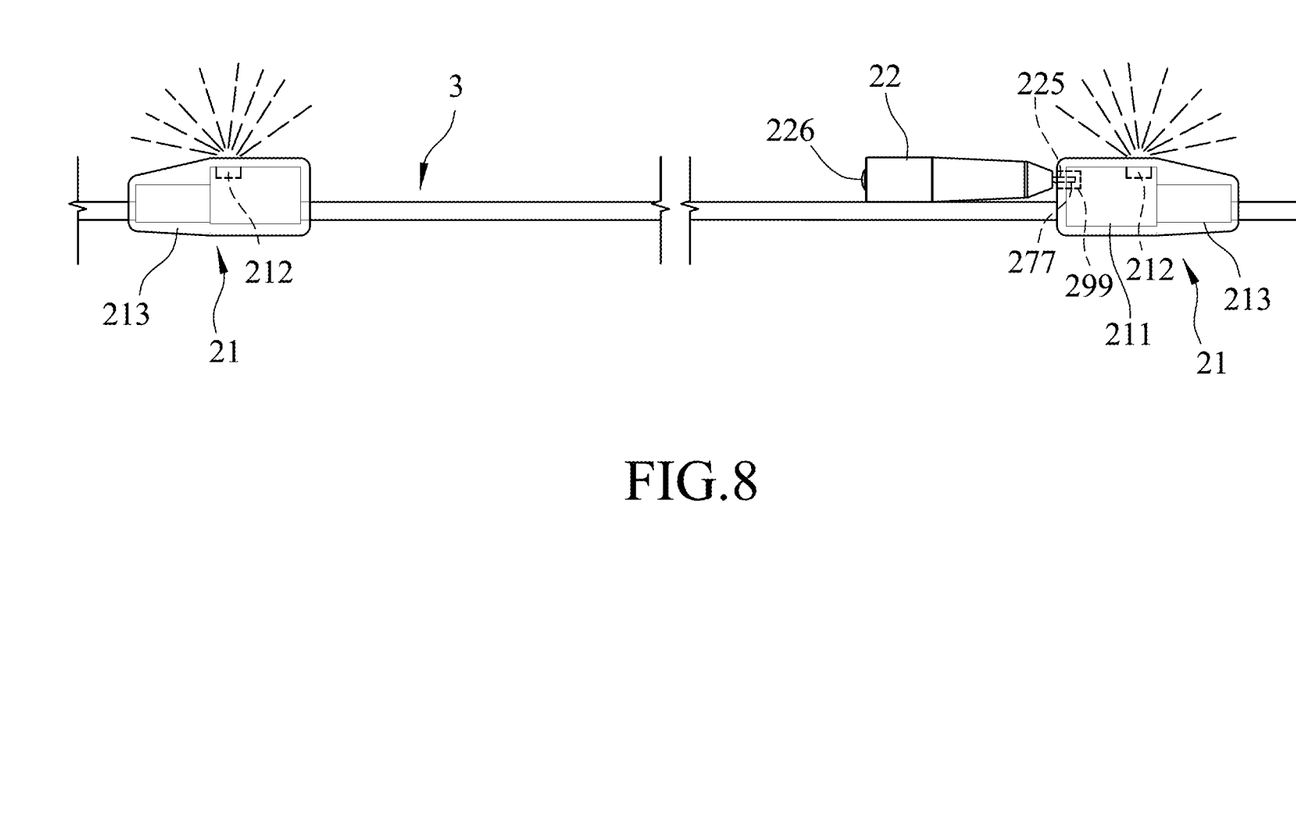
FIG. 8 is a schematic view showing the first preferred embodiment in a state of use.

Referring to FIGS. 1 and 8, the first preferred embodiment of a traceable cable assembly 2 according to the present invention is shown to include a fiber optic cable 3, a plurality of lighting units 21 (two in this embodiment), and a portable power device 22.

Figure 2:
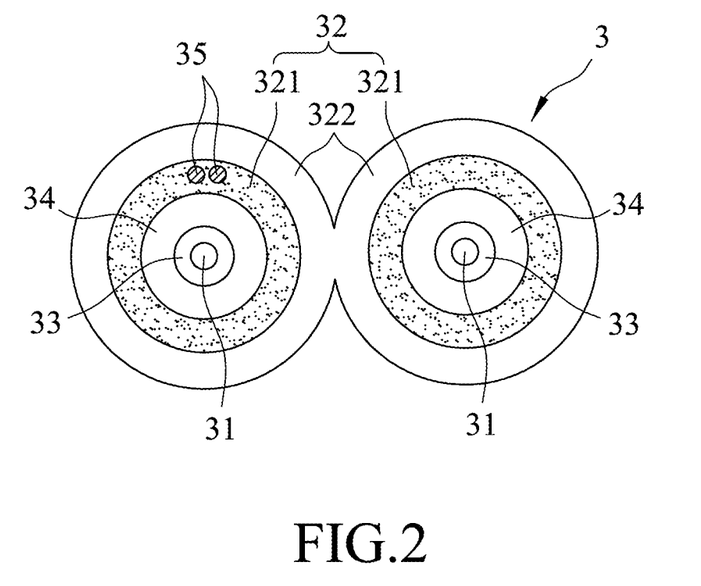
FIG. 2 is an enlarged schematic sectional view showing a fiber optic cable of the first preferred embodiment.

In this embodiment, the fiber optic cable 3 is a duplex fiber optic cable. Referring further to FIG. 2, the fiber optic cable 3 includes two optical fibers 31 spaced apart from each other, two coating layers 33 enclosing respectively the optical fibers 31, two buffering layers 34 attached respectively to the coating layers 33, two reinforcing layers 321 enclosing respectively the buffer layers 34, and two outer layers 322 attached respectively to the reinforcing layers 321. The reinforcing layers 321 are made of aramid yarn. The outer layers 322 partly interconnect each other. The reinforcing layers 321 and the outer layers 322 constitute a cable jacket 32. The fiber optic cable 3 further includes two conductive elements 35 embedded spacedly in one reinforcing layer 321 of the cable jacket 32 and extending along one optical fiber 31. Preferably, each conductive element 35 is, but not limited to, a copper wire. In addition, each optical fiber 31 has opposite ends that are each connected with a fiber optic connector 4, such as one of LC, SC, FC, ST and MPO connectors. Since the feature of this invention does not reside in the configuration of the fiber optic connector 4, which is known to those skilled in the art, details of the same are omitted herein for the sake of brevity.

The lighting units 21 are spacedly secured to the fiber optic cable 3. Preferably, the lighting units 21 are disposed adjacent respectively to opposite ends of the fiber optic cable 3 (see FIG. 1). Referring further to FIGS. 3 to 6, each lighting unit 21 includes a connecting seat 211 and a light emitting element 212.

Figure 6:
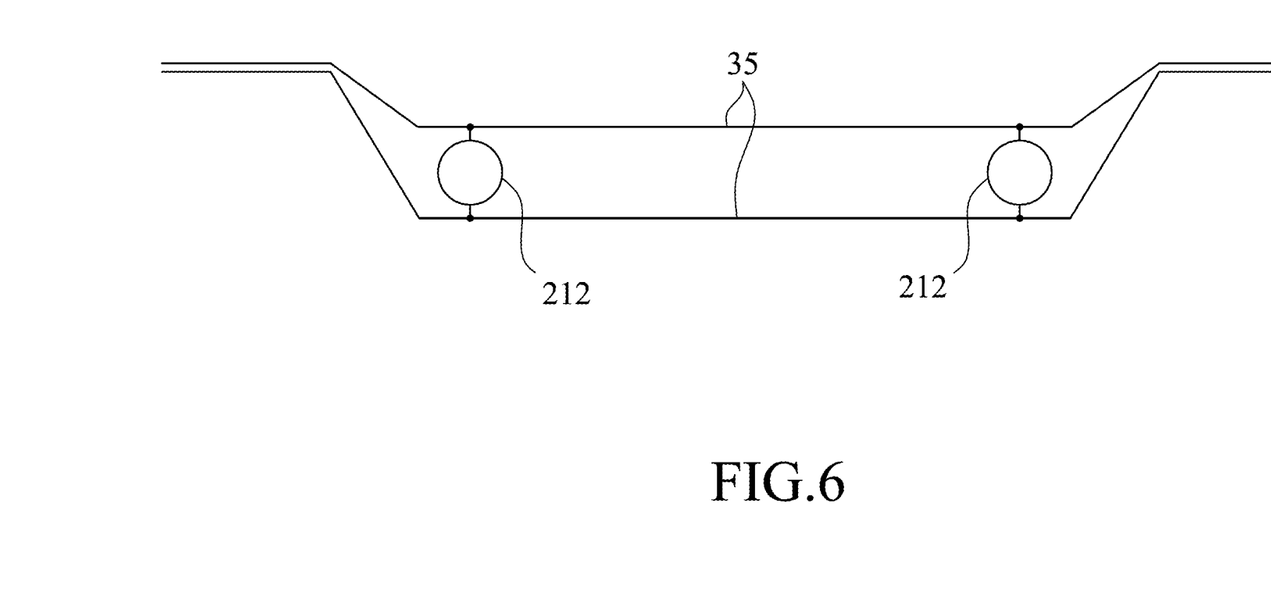
FIG. 6 is a schematic view showing an electrical connection between the conductive elements and two light emitting elements of the first preferred embodiment.

For each lighting unit 21, the connecting seat 211 is mounted to the fiber optic cable 3 and is connected electrically to the conductive elements 35 of the fiber optic cable 3. The connecting seat 211 includes a seat body 288 sleeved on the fiber optic cable 3, and an electrical socket 299 embedded into the seat body 288 and having an insertion hole 277 that is exposed from the seat body 288 (see FIG. 4). The electrical socket 299 is connected electrically to the conductive elements 35 of the fiber optic cable 3 in a manner that a corresponding section of each conductive element 35, which is pulled out of the cable jacket 32 through a slit 320 therein, is soldered to the electrical socket 299 (see FIG. 5). The light emitting element 212, such as a light emitting diode, is mounted to the connecting seat 211 and is connected electrically to the electrical socket 299, in such a way that the light emitting element 212 is exposed from the seat body 288 and that the light emitting element 212 is connected electrically between the conductive elements 35 through the electrical socket 299. As a result, the light emitting elements 212 of the lighting units 21 are coupled in parallel to each other through the conductive elements 35, as shown in FIG. 6.

Figure 3:
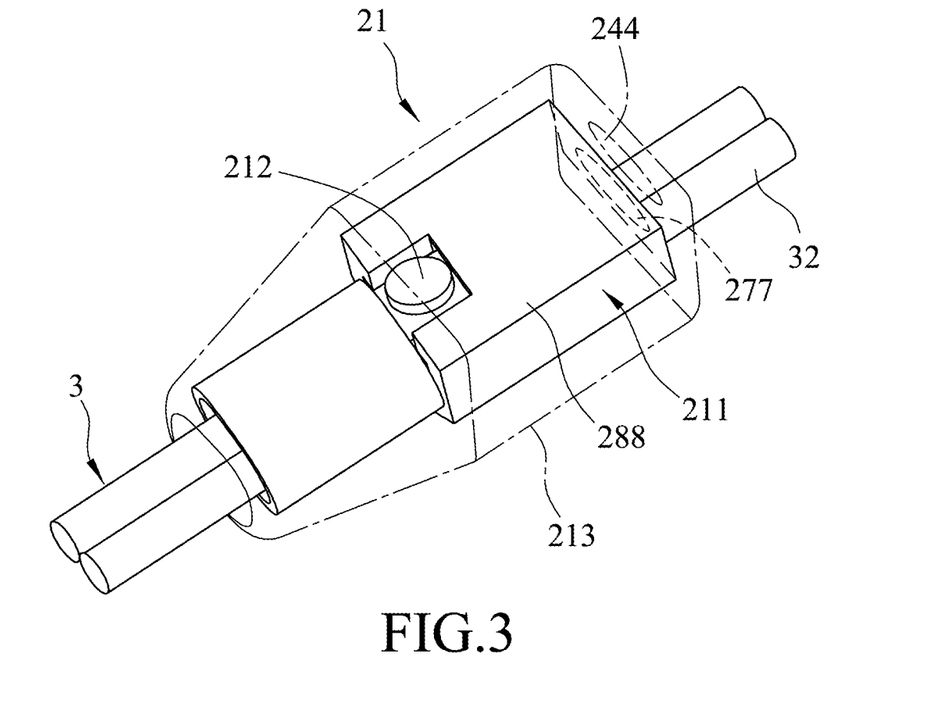
FIG. 3 is a fragmentary perspective view showing an assembly of the fiber optic cable and a lighting unit of the first preferred embodiment.
Figure 4:
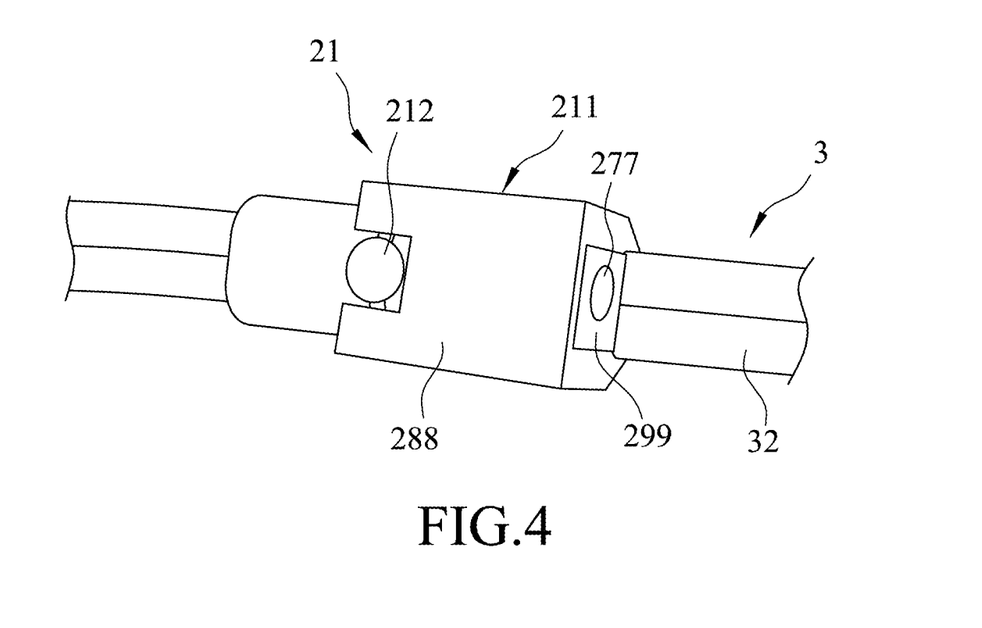
FIG. 4 is a fragmentary schematic view showing the assembly of the fiber optic cable and the lighting unit of the first preferred embodiment without an outer shell of the lighting unit.
Figure 5:
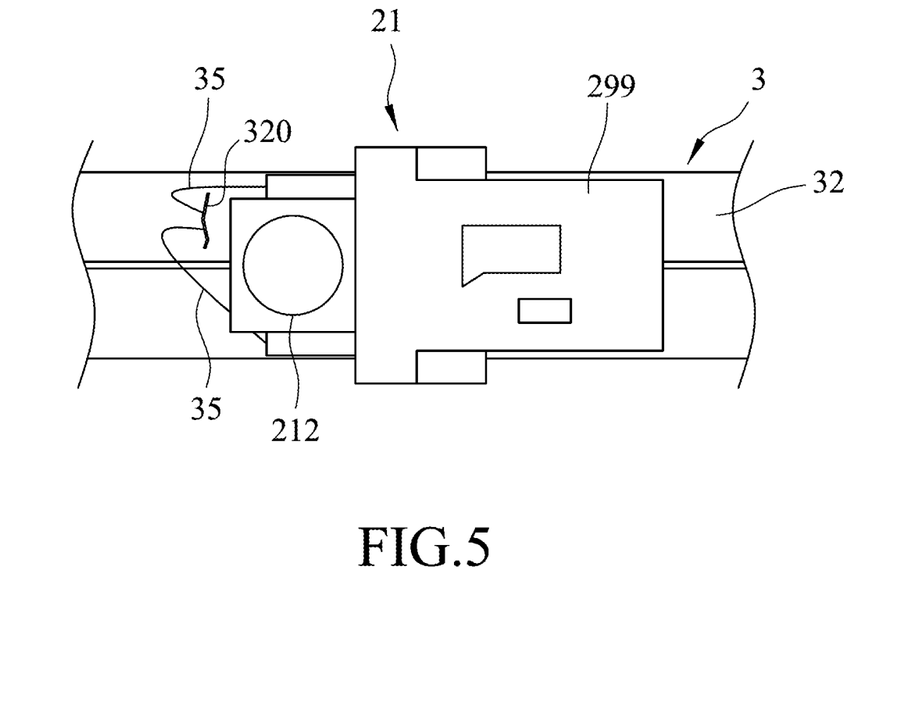
FIG. 5 is a fragmentary schematic view showing the relationship among two conductive elements of the fiber optic cable, and a light emitting element and an electrical socket of the lighting unit of the first preferred embodiment without the outer shell.

Preferably, each lighting unit 21 further includes a transparent outer shell 213 sleeved fixedly on the fiber optic cable 3 and enclosing the connecting seat 211 and the light emitting element 212, as best shown in FIG. 3. In this embodiment, the transparent outer shell 213 is formed by overmolding. In addition, the outer shell 213 is formed with an opening 244 for exposing the insertion hole 277 in the electrical socket 299 (see FIG. 3).

It is noted that, preferably, the seat body 288 of the connecting seat 211 of each lighting unit 21 is made of a plastic material, and may be designed to have the same color as that of the outer layers 322 of the cable jacket 32 so that an assembly of the fiber optic cable 3 and the lighting units 21 has a unitary appearance.

The power device 22 is detachably coupled to the connecting seat 211 of one lighting unit 21, for example, the right one in FIG. 8, for supplying a supply voltage to the light emitting element 212 of said one lighting unit 21. Since the light emitting elements 212 of the lighting units 21 are coupled in parallel to each other (see FIG. 6), the supply voltage from the power device 22 is also supplied to the light emitting element 212 of the other lighting unit 21 through the conductive elements 35 of the fiber optic cable 3. Therefore, the light emitting element 212 of each lighting unit 21 emits light in response to the supply voltage from the power device 22 (see FIG. 8).

Figure 7:
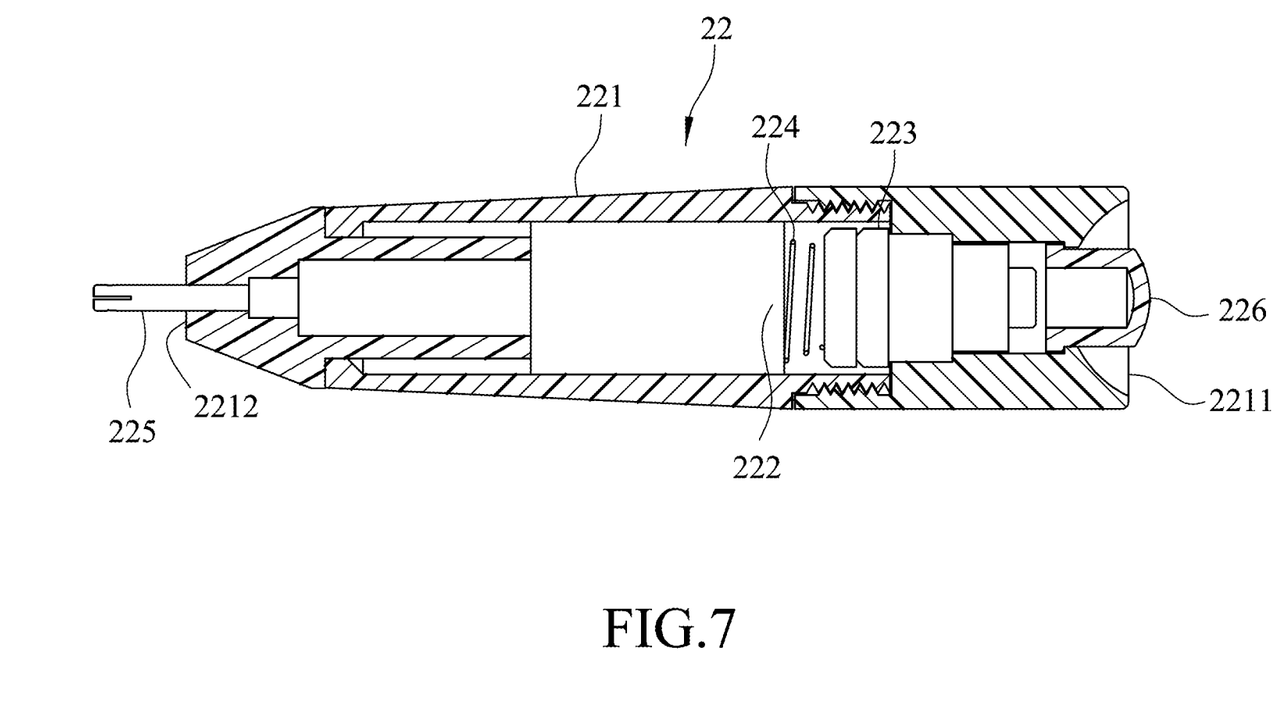
FIG. 7 is a schematic, partially-sectional view showing a power device of the first preferred embodiment when a battery unit is in a power-off position.

Referring further to FIG. 7, the power device 22 includes a barrel body 221, a supply voltage circuit 222, a battery unit 223, an output plug 225, an actuator 226 and a biasing member 224. The barrel body 221 has opposite open ends 2211, 2212. The supply voltage circuit 222 is disposed in the barrel body 221, and is operable to generate the supply voltage based on an input voltage. The battery unit 223 is disposed in the barrel body 221 for supplying the input voltage. The output plug 225 is partially disposed in the barrel body 221, and is connected electrically to the supply voltage circuit 222 for receiving the supply voltage therefrom. The output plug 225 extends out of one open end 2212 of the barrel body 221, and is detachably inserted into the insertion hole 277 in the electrical socket 299 of said one lighting unit 21 to be coupled with the electrical socket 299, such that the supply voltage outputted by the output plug 225 is supplied to the light emitting element 212 of said one lighting unit 21 through the electrical socket 299 of said one lighting unit 21, and to the other lighting unit 21 through the electrical socket 299 of said one lighting unit 21 and the conductive elements 35 of the fiber optic cable 3. The battery unit 223 is movable relative to the barrel body 221 between a power-on position, where the battery unit 223 supplies the input voltage to the supply voltage circuit 222, and a power-off position, where the battery unit 222 ceases to supply the input voltage to the supply voltage circuit 222 (see FIG. 7). The actuator 226, such as a knob, is disposed movably in the barrel body 221, and is exposed from the open end 2211 of the barrel body 221 for actuating the battery unit 223 to move from the power-off position to the power-on position by pressing the actuator 226. The biasing member 224, such as a compression spring, is disposed in the barrel body 221 for biasing the battery unit 223 toward the power-off position.

Figure 9:
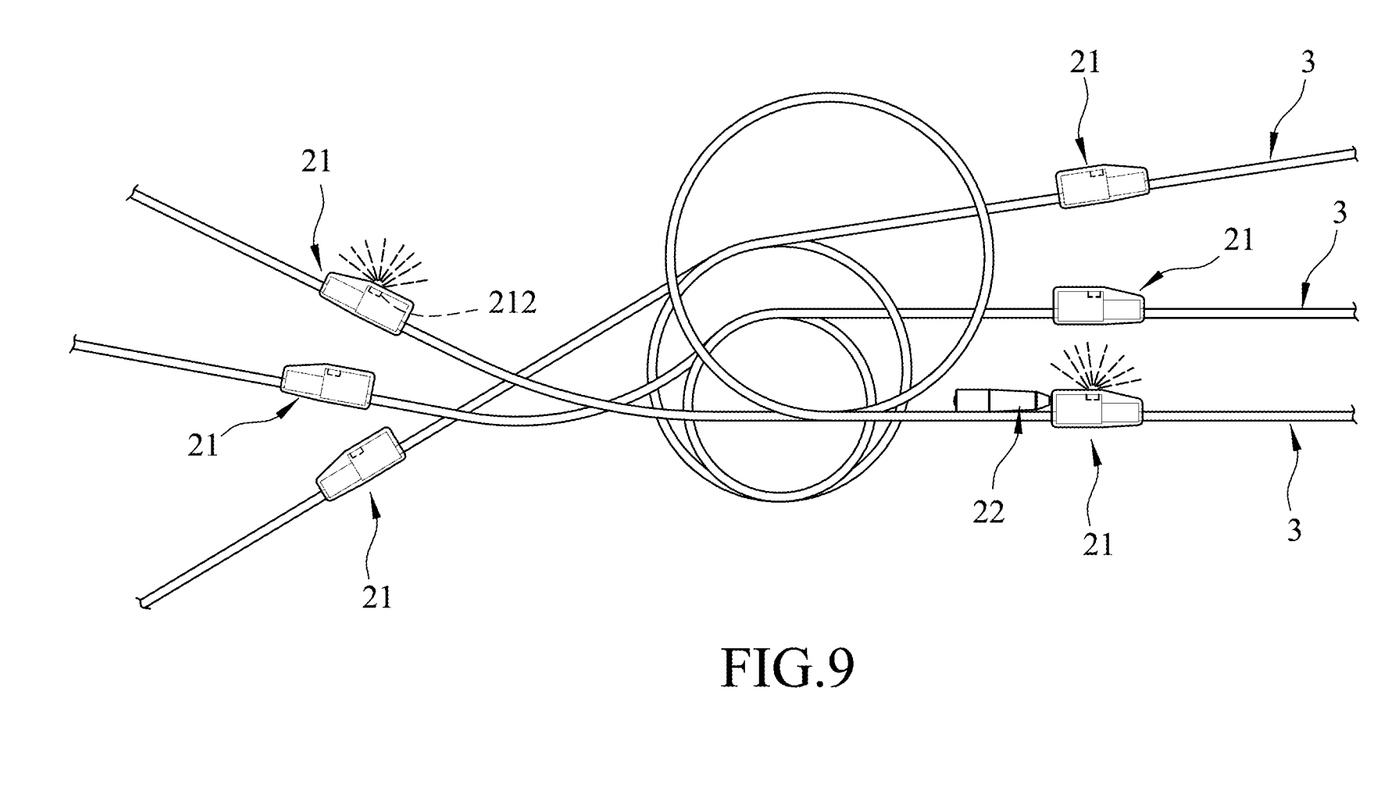
FIG. 9 is a schematic view illustrating a practical application of the first preferred embodiment.

FIG. 9 illustrates a practical application of the traceable cable assembly. In this application, when the power device 22 is coupled to one lighting unit 21 on a desired one, for example, a broken (malfunctioning) one, of the fiber optic cables 3, the desired one of the fiber optic cables 3 can be easily tracked with the light emitted by the other lighting unit 21 on the desired one of the fiber optic cables 3 even though the fiber optic cables 3 are entangled with each other.

Figure 10:
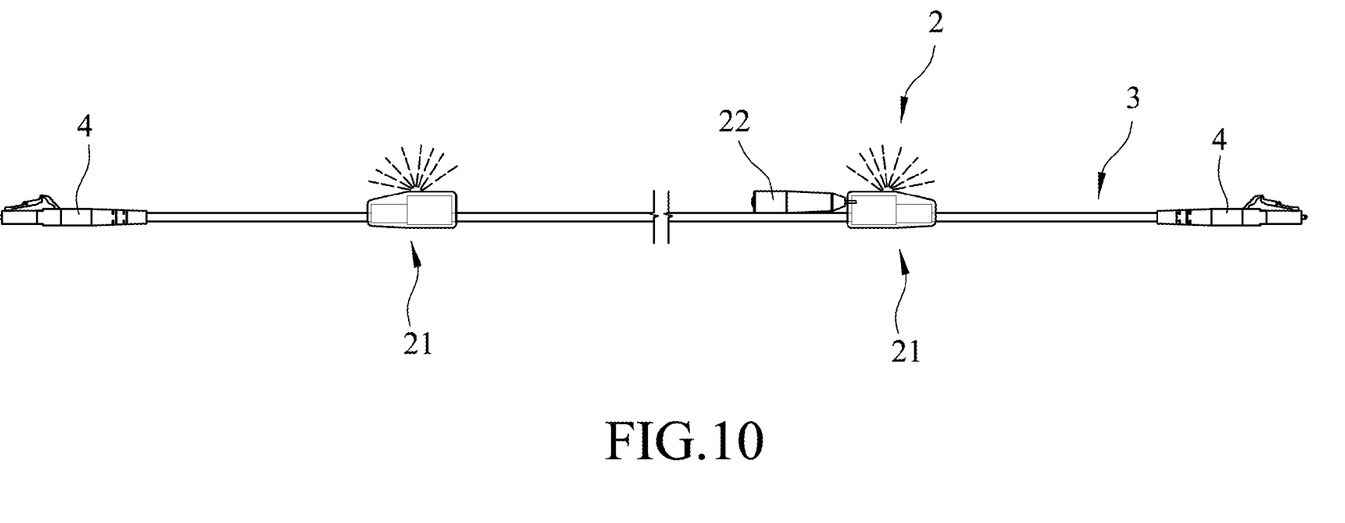
FIG. 10 is a fragmentary schematic view showing the second preferred embodiment of a traceable cable assembly according to the present invention.
Figure 11:
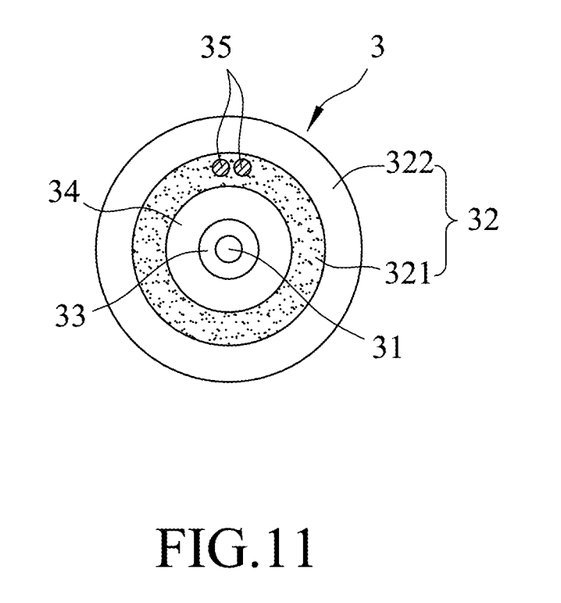
FIG. 11 is an enlarged schematic sectional view showing a fiber optic cable of the second preferred embodiment.

FIGS. 10 and 11 illustrate the second preferred embodiment of a traceable cable assembly according to this invention, which is a modification of the first preferred embodiment. Unlike the previous embodiment, the fiber optic cable 3 is a simplex fiber optic cable. The fiber optic cable 3 includes a single optical fiber 31, which is enclosed by one coating layer 33, one buffering layer 34, one reinforcing layer 321, and one outer layer 322 in order. The reinforcing layer 321 and the outer layer 322 constitute the cable jacket 32.

In view of the above, due to the presence of the conductive elements 35 and the lighting units 21, the fiber optic cable 3 can be easily tracked with the light emitted from the lighting units 21 when the power device 22 is coupled to any one of the lighting units 21. Therefore, when the traceable cable assembly of this invention is applied to a fiber optic cable bundle, which includes a group of the fiber optic cables 3 each provided with the lighting units 21 thereon, it is easy to distinguish a desired fiber optic cable 3 from the other fiber optic cables 3. Particularly, if the desired fiber optic cable 3 is broken, troublesome identification of the broken fiber optic cable 3 as encountered in the prior art can be avoided.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A traceable cable assembly comprising:
    a fiber optic cable including at least one optical fiber, a cable jacket enclosing said at least one optical fiber, and two conductive elements embedded spacedly in said cable jacket and extending along said at least one optical fiber;
    a plurality of lighting units spacedly secured to said fiber optic cable, each of said lighting units including
        a connecting seat that is mounted to said fiber optic cable and that is connected electrically to said conductive elements of said fiber optic cable, and
        a light emitting element that is mounted to said connecting seat in a manner that said light emitting element is connected electrically between said conductive elements of said fiber optic cable; and
    a portable power device detachably coupled to said connecting seat of one of said lighting units for supplying a supply voltage to said light emitting element of said one of said lighting units and to said light emitting element(s) of the other one(s) of said lighting units through said conductive elements of said fiber optic cable, such that said light emitting element of each of said lighting units emits light in response to the supply voltage from said power device.

2. The traceable cable assembly as claimed in claim 1, wherein said light emitting element of each of said lighting units is a light emitting diode.

3. The traceable cable assembly as claimed in claim 1, wherein each of said conductive elements of said fiber optic cable is a copper wire.

4. The traceable cable assembly as claimed in claim 1, wherein:
    said connecting seat of each of said lighting units includes a seat body sleeved on said fiber optic cable; and
    each of said lighting units further includes a transparent outer shell sleeved fixedly on said fiber optic cable and enclosing said connecting seat and said light emitting element.

5. The traceable cable assembly as claimed in claim 4, wherein said transparent outer shell of each of said lighting units is formed by overmolding.

6. The traceable cable assembly as claimed in claim 4, wherein, for each of said lighting units:
    said connecting seat further includes an electrical socket embedded into said seat body and connected electrically to said conductive elements of said fiber optic cable and said light emitting element in such a way that said light emitting element is connected electrically between said conductive elements of said fiber optic cable through said electrical socket, said electrical socket having an insertion hole that is exposed from said seat body; and
    said outer shell is formed with an opening for exposing said insertion hole in said electrical socket.

7. The traceable cable assembly as claimed in claim 6, wherein said power device includes:
    a barrel body having an open end;
    a supply voltage circuit disposed in said barrel body and operable to generate the supply voltage based on an input voltage;
    a battery unit disposed in said barrel body for supplying the input voltage; and
    an output plug partially disposed in said barrel body and connected electrically to said supply voltage circuit for outputting the supply voltage therefrom, said output plug extending out of said open end of said barrel body and being detachably inserted into said insertion hole in said electrical socket of said one of said lighting units to be coupled with said electrical socket of said one of said lighting units, such that the supply voltage outputted by said output plug is supplied to said light emitting element of said one of said lighting units through said electrical socket of said one of said lighting units, and to said light emitting element(s) of the other one(s) of said lighting units through said electrical socket of said one of said lighting units and said conductive elements of said fiber optic cable.

8. The traceable cable assembly as claimed in claim 7, wherein:
    said barrel body has another open end opposite to said open end;
    said battery unit of said power device is movable relative to said barrel body between a power-on position, where said battery unit supplies the input voltage to said supply voltage circuit, and a power-off position, where said battery unit ceases to supply the input voltage to said supply voltage circuit; and
    said power device further includes
        an actuator disposed movably in said barrel body and exposed from said another open end of said barrel body for actuating said battery unit to move from the power-off position to the power-on position, and
        a biasing member disposed in said barrel body for biasing said battery unit toward the power-off position.

9. An apparatus for tracking a fiber optic cable, the fiber optic cable including at least one optical fiber, a cable jacket that encloses the at least one optical fiber, and two conductive wires that are embedded spacedly in the cable jacket and that extend along the at least one optical fiber, said apparatus comprising:
    a plurality of lighting units adapted to be spacedly secured to the fiber optic cable, each of said lighting units including
        a connecting seat that is adapted to be mounted to the fiber optic cable and that is adapted to be connected electrically to the conductive wires of the fiber optic cable, and
        a light emitting element that is mounted to said connecting seat in a manner that said light emitting element is connected electrically between the conductive wires of the fiber optic cable; and
    a portable power device detachably coupled to said connecting seat of one of said lighting units for supplying a supply voltage to said light emitting element of said one of said lighting units and to said light emitting element(s) of the other one(s) of said lighting units through the conductive wires of the fiber optic cable, such that said light emitting element of each of said lighting units emits light in response to the supply voltage from said power device.

10. The apparatus as claimed in claim 9, wherein said light emitting element of each of said lighting units is a light emitting diode.

11. The apparatus as claimed in claim 9, wherein:
said connecting seat of each of said lighting units has a seat body adapted to be sleeved on the fiber optic cable; and
each of said lighting units further includes a transparent outer shell adapted to be sleeved fixedly on the fiber optic cable and enclosing said connecting seat and said light emitting element.

12. The apparatus as claimed in claim 11, wherein said transparent outer shell of each of said lighting unit is formed by overmolding.

13. The apparatus as claimed in claim 11, wherein, for each of said lighting units:
said connecting seat further includes an electrical socket embedded into said seat body, adapted to be connected electrically to the conductive wires of the fiber optic cable and coupled to said light emitting element in such a way that said light emitting element is connected electrically between the conductive elements of the fiber optic cable through said electrical socket, said electrical socket having an insertion hole that is exposed from said seat body; and
said outer shell is formed with an opening for exposing said insertion hole in said electrical socket.

14. The apparatus as claimed in claim 13, wherein said power device includes:
a barrel body having an open end;
a supply voltage circuit disposed in said barrel body and operable to generate the supply voltage based on an input voltage;
a battery unit disposed in said barrel body for supplying the input voltage; and
an output plug disposed in said barrel body and connected electrically to said supply voltage circuit for outputting the supply voltage therefrom, said output plug extending out of said open end of said barrel body and being detachably inserted into said insertion hole in said electrical socket of said one of said lighting units to be coupled with said electrical socket of said one of said lighting units, such that the supply voltage outputted by said output plug is supplied to said light emitting element of said one of said lighting units through said electrical socket of said one of said lighting units, and to said light emitting element(s) of the other one(s) of said lighting units through said electrical socket of said one of said lighting units and the conductive elements of the fiber optic cable.

15. The apparatus as claimed in claim 14, wherein:

said barrel body of said power device has another open end opposite to said open end;

said battery unit of said power device is movable relative to said barrel body between a power-on position, where said battery unit supplies the input voltage to said supply voltage circuit, and a power-off position, where said battery unit ceases to supply the input voltage to said supply voltage circuit; and said power device further includes an actuator disposed movably in said barrel body and exposed from said another open end of said barrel body for actuating said battery unit to move from the power-off position to the power-on position, and a biasing member disposed in said barrel body for biasing said battery unit toward the power-off position.

* * * * *